United States Patent [19]

Argabright et al.

[11] 4,383,930
[45] May 17, 1983

[54] MOBILITY CONTROL AGENT

[75] Inventors: Perry A. Argabright, Larkspur; John S. Rhudy; Brian L. Phillips, both of Littleton, all of Colo.

[73] Assignee: Marathon Oil Company, Findlay, Ohio

[21] Appl. No.: 161,547

[22] Filed: Jun. 20, 1980

[51] Int. Cl.³ .............................................. E21B 43/22
[52] U.S. Cl. .............................. 252/8.55 D; 166/275; 526/93
[58] Field of Search ...................... 252/8.55 D, 8.55 R; 166/275; 526/93

[56] References Cited

U.S. PATENT DOCUMENTS

| | | | |
|---|---|---|---|
| 2,380,474 | 7/1945 | Stewart | 426/213 |
| 2,380,475 | 7/1945 | Stewart | 526/199 X |
| 2,380,476 | 7/1945 | Stewart | 526/93 X |
| 2,578,910 | 12/1951 | Uraneck | 526/93 |
| 2,634,258 | 4/1953 | Stewart | 526/93 |
| 2,697,700 | 12/1954 | Uraneck | 260/29.7 M |
| 2,813,088 | 11/1957 | Meinel | 526/91 |
| 2,934,524 | 4/1960 | Phelps et al. | 526/80 |
| 3,002,960 | 10/1961 | Kolodny | 252/8.55 X |
| 3,020,953 | 2/1962 | Zerweck et al. | 252/8.55 |
| 3,039,529 | 6/1962 | McKennon | 252/8.55 X |
| 3,112,295 | 11/1963 | Marvel | 526/93 X |
| 3,804,173 | 4/1974 | Jennings | 252/8.55 X |
| 4,145,495 | 3/1979 | Robinson et al. | 526/93 |

*Primary Examiner*—Herbert B. Guynn
*Attorney, Agent, or Firm*—Jack L. Hummel

[57] ABSTRACT

Polymer mobility control agents useful in supplemental oil recovery processes, which give improved reciprocal relative mobilities, are prepared by initiating the polymerization of a monomer containing a vinyl group with a catalyst comprising a persulfate and ferrous ammonium sulfate. The vinyl monomer is an acrylyl, a vinyl cyanide, a styryl and water soluble salts thereof.

10 Claims, No Drawings

MOBILITY CONTROL AGENT

DESCRIPTION

TECHNICAL FIELD

This invention relates to the production of vinyl polymers for use as mobility control agents in oil recovery processes.

BACKGROUND ART

The use of catalysts for the polymerization of ethylenically unsaturated compounds is well known in the art. Examples of such catalysts include peroxygen catalysts, such as tertiary butyl hydroperoxide, ammonium, potassium and sodium persulfates, hydrogen peroxide, alkali metal and ammonium chlorates, perborates, percarbonates, etc. Redox catalyst systems of an oxygen containing compound and a reducing agent, such as sodium thiosulfate, sodium or potassium bisulfite, hydroquinone, etc. are also well known. U.S. Pat. No. 3,002,960 utilizes a redox catalyst comprising a water soluble persulfate or peroxide and a tertiary amine to obtain high molecular weight polyacrylamides having an intrinsic viscosity of greater than 12 deciliters per gram.

PRIOR ART STATEMENT

U.S. Pat. Nos. 2,380,474, 2,380,475 and 2,380,476 all teach the use of a redox catalyst system for emulsion polymerization of unsaturated organic compounds wherein the reductant portion of the redox system consists of a heavy metal in conjunction with another compound. In '474 the heavy metal is used in conjunction with an aliphatic carboxylic organic acid. In '475 the heavy metal is used in conjunction with an aliphatic compound having a thiol or a disulfide linkage and an amino hydroxy or carboxy group. The heavy metal of '476 is used in conjunction with an aliphatic polyhydroxy organic compound, for example a sugar.

U.S. Pat. No. 2,578,910 discloses an emulsion copolymerization process which utilizes a polymerization activator comprising a heavy metal in combination with a heterocyclic nitrogen compound containing a basic structure of 2,2'-dipyridyl.

U.S. Pat. No. 2,634,258 discloses a cold rubber polymerization process which utilizes a redox catalyst comprising an oxidant and a reductant which is a ferrous salt of a sugar acid, i.e., a monocarboxy polyhydroxy acid containing from 4 to 7 carbon atoms and from 3 to 6 hydroxy groups (exclusive of the OH group occurring in the carboxy group).

U.S. Pat. No. 2,697,700 relates to the use of a metal salt and a complexing agent as the reductant portion of a redox catalyst used in a cold emulsion polymerization process.

U.S. Pat. No. 2,813,088 discloses a process for the formation of water insoluble polyacrylamides by polymerizing the acrylamide in the presence of a strong acid and a polymerization-initiating redox system comprising a salt of a multivalent metal and an oxygen rich reagent.

The use of heavy metals, including iron, is generally known in the art as is the fact that heavy metals are also capable of inhibiting polymerization. Additionally, the use of polyacrylamides as mobility control agents in oil recovery flooding processes is also known. However, heretofore it has not been recognized that the use of ferrous ammonium sulfate in conjunction with a persulfate as a polymerization catalyst will result in the formation of a polymer giving increased permeability reduction in porous media over polymers made with a conventional catalyst, e.g., ammonium persulfate and sodium bisulfite. This increase in permeability reduction results in a superior mobility control agent, useful for oil recovery processes.

DISCLOSURE OF THE INVENTION

Water soluble vinyl polymers, wherein the vinyl is an acrylyl vinyl, a vinyl cyanide or a styryl vinyl, which are prepared by polymerization in the presence of a catalyst comprising a persulfate and ferrous ammonium sulfate have increased screen factors, increased reciprocal mobilities in subterranean formations and increased permeability reduction in subterranean formations over polymers prepared with conventional catalysts. The persulfate is generally used in an amount of from about 50 to about 1,200 parts per million parts of monomer and the ferrous ammonium sulfate is used in an amount of from about 85 to about 2,000 parts per million parts monomer.

Partially hydrolyzed, high molecular weight, water soluble vinyl polymers of the type described are useful as mobility control agents for optimizing flooding processes of subterranean formations containing hydrocarbons. The polymer is added to or used as a displacing fluid with the polymer optimally imparting a mobility to the displacing fluid which is equal to or less than that of the combination of the formation fluids (hydrocarbon and interstitial water) within the reservoir. Vinyl polymers, e.g., polyacrylamides, prepared in accordance with the present invention have about twice the mobility control of vinyl polymers used previously.

BEST MODE FOR CARRYING OUT THE INVENTION

The process of the present invention entails the production of a polymer by the polymerization of an ethylenically unsaturated monomer in the presence of a catalyst comprising a persulfate and ferrous ammonium sulfate. The polymer is prepared from a water soluble monomer which must contain at least one vinyl grouping wherein the vinyl is an acrylyl, a vinyl cyanide, a styryl and water soluble salts thereof. When the vinyl is an acrylyl it is of the formula: $CH_2=CY-CO-X$, wherein X is a hydrogen, an amino group ($NH_2$), a hydroxy group, a methyl group or a OR group wherein R is a lower alkyl and wherein Y is a hydrogen or a methyl group. Examples of suitable monomers include, acrylamide, acrylic acid, acrylonitrile, methacrylic acid, methacrylamide, methacrylonitrile, methyl methacrylate and sodium styrenesulfonate. A preferred monomer is acrylamide. It is preferred that the monomer be polymerized in an aqueous solution. The aqueous monomer solution contains from about 1 to about 20 weight percent, preferably from about 2 to about 10 weight percent and most preferably from about 3 to about 7 weight percent monomer. Either water or distilled water can be used as the aqueous component of the monomer solution.

The pH of the monomer solution is not critical and it will be governed by the practical time limits for polymerization. Thus, the pH will generally range from about 4 to about 11 and a pH range of from about 6 to about 8 is preferred. A pH lower than about 4 may be used, however, the polymerization will occur at a much faster rate resulting in a lower molecular weight polymer. At a pH greater than about 11 the polymerization will occur at a much slower rate resulting in a higher molecular weight polymer. The temperature of the polymerization process is not narrowly critical and it will generally range from about 5° C. to about 100° C. with from about 20° C. to about 65° C. being the preferred temperature range. At temperatures less than about 5° C. the polymerization occurs at a much slower rate, whereas at temperatures above about 100° C. the polymerization occurs at a much faster rate resulting in a lower molecular weight polymer. Additionally, at temperatures above about 100° C. special equipment must be utilized, e.g., pressurized vessels. The time period for the polymerization is dependent upon the concentration of catalyst. The time required for polymerization generally decreases as the concentration of catalyst increases. The time period will range from about 1 to about 200 hours with from about 4 to about 72 hours being preferred.

Since oxygen is inhibitory to the polymerization process, the polymerization step should be conducted in the substantial absence of free oxygen. It is preferred that the amount of free oxygen in the monomer solution be less than about 0.1 parts per million.

The polymerization of the monomer solution is initiated through the use of a catalyst wherein a portion of the catalyst is a persulfate. Examples of useful persulfates include ammonium, potassium and sodium persulfates. Ammonium persulfate is a preferred persulfate. The persulfate will generally be used in an amount of from about 50 to about 1,200 parts per million parts of monomer and about 100 to about 400 parts per million parts of monomer are preferred. The other portion of the catalyst is ferrous ammonium sulfate which is used in an amount of from about 85 to about 2,000 parts per million parts of monomer and from about 170 to about 680 parts per million is preferred. Generally, the lower the concentration of catalyst used, the higher the screen factor of the resulting polymer. The higher screen factor is indicative of a greater reciprocal mobility and greater permeability reduction which a solution of the polymer will exhibit in a subterranean formation. However, as is known in the art, as the concentration of catalyst is reduced, the more unrealiable the polymerization process becomes. Thus, the amount of catalyst used is dependent upon the interaction of several parameters, e.g., pH, temperature, concentration of monomer, desired properties of the resultant polymers, etc., which is known to those in the art. Although the ratio of the persulfate compound to the ferrous ammonium sulfate is not critical, it is preferred that the catalyst comprises more of the ferrous ammonium sulfate than of the persulfate compound. The ratio of ferrous ammonium sulfate to persulfate compound is from about 1.2 to about 2.0 with a ratio of about 1.5 to about 1.8 being preferred.

When the polymer formed contains amide groups or ester groups, after the polymerization is completed, then from about 20 to about 40 mole percent of the amide or ester groups in the polymer are hydrolyzed with a monovalent base, for example, sodium or potassium hydroxide. It is preferred that from about 25 to about 35 mole percent of the amide or ester groups in the polymer be hydrolyzed. Examples of hydrolyzable polymers include polymers derived from acrylamide, methyl acrylamide, methyl acrylate and methacrylate. The hydrolysis of the polymer is well known in the art and it is generally conducted at a temperature of from about 52° C. to about 80° C. and preferably from about 55° C. to about 66° C. for a time period of from about 2 to about 48 hours.

For the purposes of preparing a mobility control agent useful is supplemental recovery of oil, the polymer solution is diluted, either before or after its hydrolysis, to obtain a solution containing from about 1 to about 10 percent by weight polymer. The aqueous solution of the polymer containing from about 1 to about 10 percent of the polymer is finally diluted to obtain a solution containing from about 100 to about 3,000 parts polymer per million parts of solution. It is this solution which is used as a mobility control agent in the supplemental recovery of oil from subterranean formations. The final dilution is implemented with water. Fresh water is preferred. The resulting aqueous solution used as a mobility control agent will generally have a viscosity of from about 2 to about 1,000 centipoises and preferably from about 10 to about 100 centipoises.

EXAMPLE 1

A series of polymerizations of acrylamide were conducted in a 1 liter stirred reactor at 38° C. using 5 percent acrylamide monomer in an aqueous solution. The polymerization of each sample of monomer was initiated by a catalyst the composition of which is indicated in Table 1. After polymerization, all of the polymer solutions were diluted to a 1 percent polymer concentration and then about 30 mole percent of the polymer was hydrolyzed with sodium hydroxide. Thereafter, all of the A samples were diluted to 615 parts per million parts polymer with 80 percent zeolite treated Palestine water and all of the B samples were diluted to 1,000 parts per million polymer in synthetic raw Palestine water containing 500 parts per million total dissolved solids including 100 parts per million divalent cations. The screen factor of each of the samples was measured by comparing the flow rate of each of the polymer solutions to that of water through a screen viscometer containing five, 0.25 inch diameter, 100 U.S. mesh sized, screens. The screen factors are given below in Table 1.

TABLE 1

| Sample | | Catalyst (PPM) | Screen Factor |
|---|---|---|---|
| 1 | | $(NH_4)_2S_2O_8(400)$: $NaHSO_3(180)$ | |
| | A | | 13.2 |
| | B | | 15.0 |
| 2 | | $(NH_4)_2S_2O_8(400)$: $NaHSO_3(180)$ | |
| | A | | 12.7 |
| 3 | | $(NH_4)_2S_2O_8(400)$: $(NH_4)_2Fe(SO_4)_2(680)$ | |
| | A | | 17.5 |
| | B | | 17.0 |
| 4 | | $(NH_4)_2S_2O_8(100)$: $(NH_4)_2Fe(SO_4)_2(170)$ | |
| | A | | 29.9 |
| | B | | 36.0 |
| 5 | | $(NH_4)_2S_2O_8(200)$: $(NH_4)_2Fe(SO_4)_2(340)$ | |
| | B | | 36.0 |
| 6 | | $(NH_4)_2S_2O_8(400)$: $NaHSO_3(164)$: $(NH_4)_2Fe(SO_4)_2(68)$ | |
| | A | | 22.8 |
| | B | | 26.0 |

EXAMPLE 2

Comparative mobility control data for Samples 2A, 4A and 6A of Example 1 were obtained by flooding water-saturated cores from the Main Consolidated (Robinson) Sand of Crawford County, Ill. Each of the cores had a permeability of about 100 millidarcys. Because mobility behavior of polymer solutions in oil bearing reservoirs is dependent upon the permeability of the reservoir, each of the cores was flooded initially with water to determine its initial permeability. Thereafter, the cores were flooded with 10 pore volumes of polymer solution to obtain the reciprocal relative mobility for the polymer sample. Then the flushed permeability of each core was measured by flooding the core with water until pressure drop stabilized. All core flooding was conducted at a velocity of 10 feet per day. The permeability reduction of each of the polymer solutions was determined by the ratio of the initial permeability to the flushed permeability. The reciprocal relative mobility of each of the polymer solutions was determined in accordance with Darcy's equation:

$$\text{reciprocal relative mobility} = KA(\Delta P)/ql$$

wherein K is the permeability in darcys, A is the cross sectional area of the core in square centimeters, $\Delta P$ is pressure drop in atmospheres, q is the flow rate in cubic centimeters per second and l is the length of the core in centimeters.

In order to normalize any small effect in polymer behavior caused by the use of different cores, Dow 700 (a polyacrylamide marketed by the Dow Chemical Company), diluted to a solution of 615 parts per million, was injected into each of the cores. The reciprocal relative mobility, flushed permeability, and permeability of the Dow 700 were measured. The ratio of reciprocal relative mobility and the ratio of the permeability reduction of the samples to the Dow 700 were also determined. The values are given below in Table 2. The permeability measurements (K) were measured in millidarcys (md) and reciprocal relative mobilities ($\lambda^{-1}$) were measured in centipoises (cp).

TABLE 2

| | SAMPLE | | |
|---|---|---|---|
| | 2A | 4A | 6A |
| Initial K, md | 110 | 105 | 79 |
| $\lambda^{-1}$, cp | 24.8 | 49.4 | 46.6 |
| Flushed K, md | 12.1 | 5.5 | 4.1 |
| Permeability Reduction | 9.1 | 19.0 | 19.0 |
| $\lambda^{-1}$, cp, Dow 700 | 45.4 | 52.7 | 51.2 |
| Flushed K, md, Dow 700 | 6.4 | 3.0 | 2.6 |
| Permeability Reduction, Dow 700 | 17.0 | 35.0 | 31.0 |
| Permeability Reduction Ratio (Sample/Dow 700) | 0.53 | 0.54 | 0.63 |
| $\lambda^{-1}$, Ratio (Sample/Dow 700) | 0.55 | 0.94 | 0.91 |

EXAMPLE 3

Comparative mobility control data for Samples 1A, 3A and 6A of Example 1 were obtained by flooding water-saturated Robinson Sand cores from Crawford County, Ill. Each of the cores had a permeability of 200 millidarcys. The core flooding was conducted in the manner described in Example 2. The results are given below in Table 3.

TABLE 3

| | SAMPLE | | |
|---|---|---|---|
| | 1A | 3A | 6A |
| Initial K, md | 195 | 204 | 189 |
| $\lambda^{-1}$, cp | 18.4 | 30.8 | 39.1 |
| Flushed K, md | 49.6 | 21.7 | 15.7 |
| Permeability Reduction | 4.2 | 9.4 | 12.0 |
| $\lambda^{-1}$, cp, Dow 700 | 31.2 | 44.1 | 41.9 |
| Flushed K, md, Dow 700 | 17.5 | 11.5 | 9.5 |
| Permeability Reduction, Dow 700 | 11.0 | 17.0 | 20.0 |
| Permeability Reduction Ratio (Sample/Dow 700) | 0.37 | 0.53 | 0.60 |
| $\lambda^{-1}$ Ratio (Sample/Dow 700) | 0.59 | 0.70 | 0.93 |

What is claimed is:

1. In a process for the recovery of hydrocarbons from a subterranean formation which comprises introducing into the formation as a mobility control agent an aqueous solution of a high molecular weight polyacrylamide composition, and forcing the solution through the formation, the improvement which comprises preparing the high molecular weight polyacrylamide composition by conducting the aqueous solution polymerization of a water soluble acrylamide monomer in the presence of a catalyst consisting essentially of a persulfate and ferrous ammonium sulfate, the persulfate and the ferrous ammonium sulfate being present in an amount sufficient to provide a polymer having increased permeability reduction capabilities thereby enhancing the mobility control properties of the polyacrylamide composition.

2. A process for the preparation of a high molecular weight polyacrylamide composition for injection as a mobility control agent into a subterranean formation to displace hydrocarbons from the formation, comprising:
    (a) polymerizing an aqueous solution of an acrylamide monomer wherein the polymerization is initiated by a catalyst consisting essentially of a persulfate and ferrous ammonium sulfate and wherein the monomer solution contains less than about 0.1 parts of free oxygen per million parts of monomer solution,
    (b) partially hydrolyzing the amide groups contained in the polymer, and
    (c) diluting the partially hydrolyzed polymer of step (b) to obtain a solution having from about 100 to about 3,000 parts of the polymer per million parts of the solution.

3. The process of claim 2 wherein the persulfate is used in an amount of from about 30 to about 1,200 parts per million parts of monomer and the ferrous ammonium sulfate is used in an amount of from about 85 to about 2,000 parts per million parts of monomer.

4. The process of claim 2 wherein the persulfate is selected from the group consisting of sodium persulfate, potassium persulfate and ammonium persulfate.

5. The process of claim 4 wherein the ratio of ferrous ammonium sulfate to persulfate is from about 1.2 to about 2.0.

6. The process of claim 2 wherein step (b) hydrolyzes from about 20 to about 40 mole percent of the amide groups in the polymer.

7. A process for the preparation of a high molecular weight, water soluble, polyacrylamide composition for injection as a mobility control agent into a subterranean formation to displace hydrocarbons from the formation, comprising:

(a) polymerizing an aqueous solution containing from about 1 to about 20 weight percent of an acrylamide monomer, wherein the polymerization is initiated by a catalyst consisting essentially of a persulfate and ferrous ammonium sulfate, the persulfate being present in an amount of from about 50 to about 1,200 parts per million parts of monomer and the ferrous ammonium sulfate being present in an amount of from about 85 to about 2,000 parts per million parts of monomer and wherein the monomer solution contains less than about 0.1 parts of free oxygen per million parts of monomer solution, (b) diluting the polymer solution of step (a) to contain from about 1 to about 10 weight percent of polymer, (c) hydrolyzing from about 20 to about 40 mole percent of the amide groups contained in the polymer solution of step (b) with a monovalent base, and (d) diluting the partially hydrolyzed polymer of step (c) to obtain a solution having from about 100 to about 3,000 parts of the polymer per million parts of solution.

8. The process of claim 7 wherein the ratio of ferrous ammonium sulfate to persulfate is from about 1.2 to about 2.0.

9. The process of claim 7 wherein the ratio of ferrous ammonium sulfate to persulfate is from about 1.5 to about 1.8.

10. A polyacrylamide composition for injection into a subterranean formation to displace hydrocarbons from the formation prepared in accordance with the process of claim 2 or claim 7.

* * * * *